United States Patent [19]

Dommer et al.

[11] Patent Number: 5,124,533

[45] Date of Patent: Jun. 23, 1992

[54] PIVOTABLE CLAMPING ELECTRICAL HEATING DEVICE FOR A THERMOPLASTIC PIPE WELDING JIG

[76] Inventors: Armin Dommer, Eichweg 13; Dieter Dommer, Bahnofstr. 5, both of D-7257 Ditzingen 1, Fed. Rep. of Germany

[21] Appl. No.: 602,336

[22] PCT Filed: Mar. 22, 1990

[86] PCT No.: PCT/DE90/00229
§ 371 Date: Dec. 7, 1990
§ 102(e) Date: Dec. 7, 1990

[87] PCT Pub. No.: WO90/11885
PCT Pub. Date: Oct. 18, 1990

[30] Foreign Application Priority Data

Apr. 10, 1989 [DE] Fed. Rep. of Germany ....... 3911633

[51] Int. Cl.$^5$ .................. B29C 65/20; B29L 23/22
[52] U.S. Cl. .................... 219/243; 219/524; 156/304.6; 285/41
[58] Field of Search ............. 219/243, 535, 524–525; 156/499, 304.2, 304.6, 507; 285/41

[56] References Cited

U.S. PATENT DOCUMENTS

| | | | |
|---|---|---|---|
| 1,864,666 | 6/1932 | Osborne | 219/535 |
| 2,992,838 | 7/1961 | Wallace | 285/21 |
| 3,391,045 | 7/1968 | Mojonnier et al. | |
| 3,484,321 | 12/1969 | Oswald | 156/499 |
| 3,519,023 | 7/1970 | Burns, Sr. et al. | 219/535 |
| 3,727,289 | 4/1973 | Bemelmann et al. | 285/21 |
| 3,729,360 | 4/1973 | McElroy | 156/507 |
| 3,987,276 | 10/1976 | Vogelsanger et al. | 219/535 |
| 4,352,708 | 10/1982 | McElroy | 156/304.6 |
| 4,536,644 | 8/1985 | Thalmann | 219/535 |
| 4,927,999 | 5/1990 | Hanselka | 219/535 |

FOREIGN PATENT DOCUMENTS

| | | | |
|---|---|---|---|
| 0263980 | 9/1987 | European Pat. Off. | |
| 1479185 | 9/1963 | Fed. Rep. of Germany | |
| 2734910 | 8/1977 | Fed. Rep. of Germany | |
| 1401370 | 4/1965 | France | |
| 52-27483 | 3/1977 | Japan | 156/304.6 |
| 667316 | 9/1988 | Switzerland | |
| 2002477 | 2/1979 | United Kingdom | 285/21 |
| 80/02124 | 10/1980 | World Int. Prop. O. | 285/21 |

Primary Examiner—Bruce A. Reynolds
Assistant Examiner—John A. Jeffery
Attorney, Agent, or Firm—Speckman & Pauley

[57] ABSTRACT

A heating device for a welding jig having two guide arms for welding together plastic pipe comprises two semi-circular electrical heating plates joined at one end by a pivotal or adjustable connection. Both ends of the heating plates have recesses for receiving the two guide arms when the heating device is in its closed position, enclosing the plastic pipes to be welded. The non-pivotally or non-adjustably connected ends of the heating plates are held together by a quick-release closure, such as a toggle catch, when the heating device is in its closed position.

18 Claims, 1 Drawing Sheet

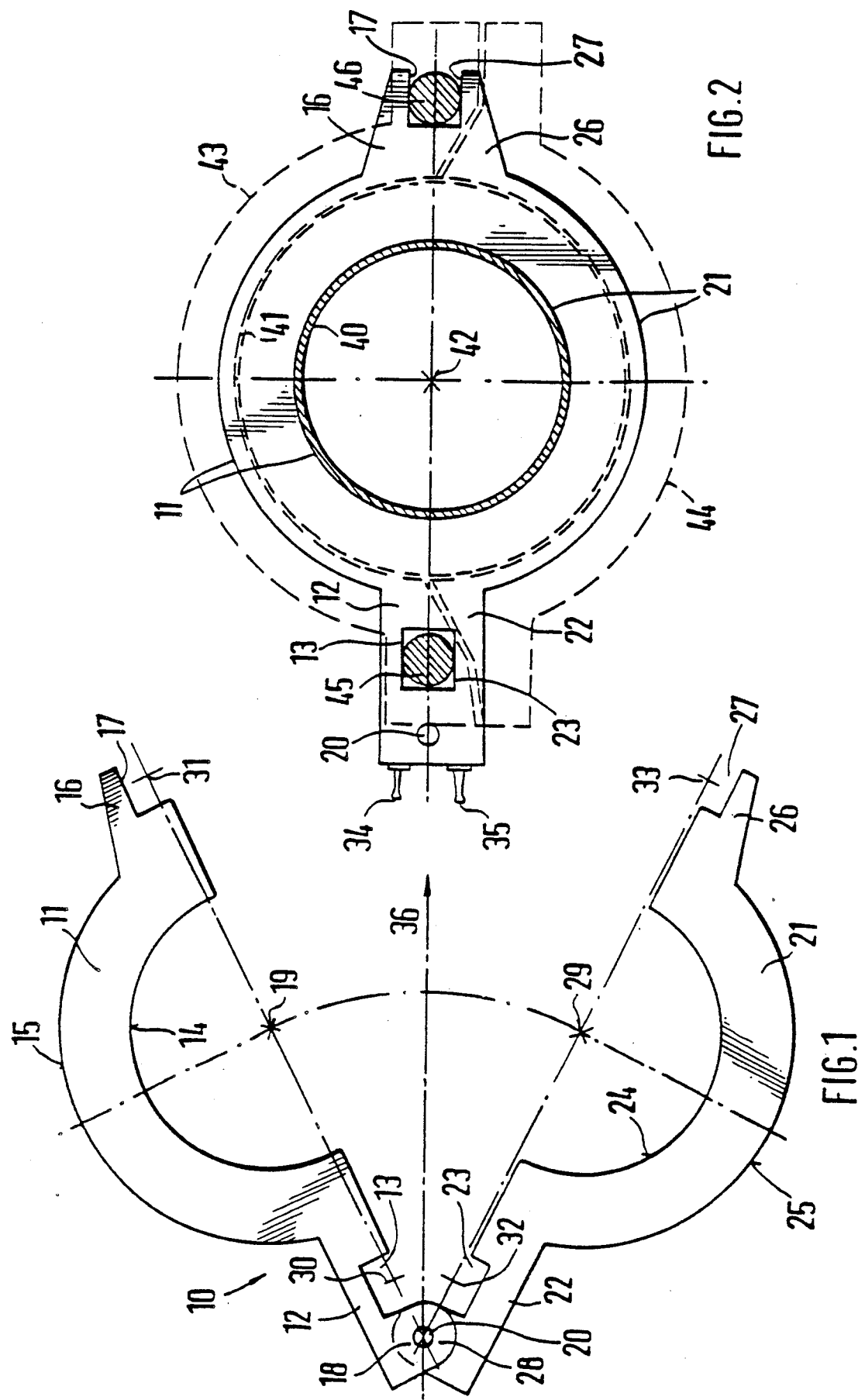

PIVOTABLE CLAMPING ELECTRICAL HEATING DEVICE FOR A THERMOPLASTIC PIPE WELDING JIG

BACKGROUND OF THE INVENTION

1. Field of the Invention

This invention relates to a heating device for a welding jig having two guide arms with clamping devices for securing the plastic pipe sections or plastic moldings to be welded together. The clamping devices are displaceable in relation to each other. Two semi-circular electrical heating plates are connected or can be connected with each other at their free ends such that their interior receptacles face each other.

2. Description of Prior Art

Such welding jigs are preferably used when welding plastic pipes in a trench. In this application, there is little space for the plastic pipe sections to be connected to each other. The welding process is further impeded where the plastic pipe sections are to be placed as protective pipes on an already existing inner pipe and must be welded together.

A heating device with two pivotably connected heating plates inserted vertically in relation to the plane defined by the two guide arms is known. When pivoted apart, the heating plates can be slipped on the inner pipe. However, the two guide arms limit the opening angle of the heating device. Therefore, an inner pipe with a small diameter requires a welding jig with guide arms sufficiently far apart. However, such a welding jig requires a wide trench.

It is an object of the invention to provide a heating device of the previously mentioned type in which it is also possible to heat outer pipes placed on an inner pipe without using a welding jig in which the guide arms are far apart.

In accordance with this invention, this object is attained due to the radius of the interior receptacles of the heating plates being the same as or greater than the radius of the outer dimension of an inner pipe on which the outer pipe to be welded is slipped and the radius of the outer circumference of the heating plates being greater than the radius of the outer circumference of the outer pipes. In addition, the heating plates have radially outwardly directed extensions at their free ends which have recesses to receive the guide arms of the welding jig. The connecting points of the heating plates are located in the areas of the extensions outside of these recesses for the guide arms.

When the heating plates are opened, the heating device can be slipped on parallel to the plane of connection of the guide arms without the guide arms limiting the opening range of the heating plates. Consequently, the inner pipe can have a diameter which may be considerably larger in relation to the distance between the guide arms than in the known welding jig and heating devices. The heating device of this invention, when applied, is additionally supported and centered by the guide arms, considerably reducing set-up time. Removal of the heating device is also easier.

In embodiments of this invention where one half of each recess is distributed on each free end of the two heating plates, the heating device can be constructed of two almost identical heating plates. In these embodiments of the invention, the distance between the centers of the centering of the plastic pipe sections or plastic moldings held in the clamping devices is also easier. To obtain exact centering, the distance between the centers of the recesses corresponds to the distance between the center longitudinal axes of the two guide arms and the recesses and the center of the closed heating plates is one half of the distance between the centers of the recesses.

In one embodiment of this invention, the heating plates are connected as a non-detachable unit, hinged together at a first set of corresponding extensions, the hinge axis being oriented vertically to the heating surfaces of the heating plates. In another embodiment, the heating plates are adjustably connected to each other at the first set of corresponding extensions, the direction of adjustment extending vertically to the plane of separation of the heating plates.

Securing the heating plates in the closed position is achieved in a simple manner. The second set of corresponding extensions of the heating plates are connected to each other by means of a quick-release closure, for example, a toggle catch.

A compensating movement of the heating plates, necessary during heating, is made possible by the recesses of the first set of corresponding extensions being in the shape of semicircular or rectangular grooves which are one-half of the dimensions of the diameters of the guide arms, and by the recesses of the second set of corresponding extensions being open towards the end of the extensions and in their depth are one-half of the diameters of the guide arms.

The heating device is maintained on one of the guide arms but is displaceable in respect to the other guide arm.

BRIEF DESCRIPTION OF THE DRAWINGS

The invention will be described by means of an exemplary embodiment illustrated in the drawings.

FIG. 1 shows a lateral view of the heating device in the pivoted opened position of the heating plates.

FIG. 2 shows a lateral view of the heating device in the closed position and connected to the welding jig.

DESCRIPTION OF PREFERRED EMBODIMENTS

FIG. 1 illustrates how to pivot the two, practically identical heating plates 11 and 21 of the heating device 10 around the pivot shaft 20 and bring them into an opened position. The heating plates 11 and 21 are semicircular. The interior receptacles 14 and 24 have a radius, starting at the center 19 or 29, which is as large or larger than one-half of the outer dimension of the inner pipe 40 on which the outer pipe 41, which pipes are to be connected to each other, are slipped. The outer pipe 41 is fixed in a clamping device consisting of halves 43 and 44 which are held on the two guide arms 45 and 46, on which they are adjustable. The orientation of the outer pipe 41 to the center longitudinal axis 42 is provided by the clamping device. The radius of the exterior circumference 15 or 25 of the heating plates depends on the exterior dimensions of the outer pipe 41. However, it is greater than one-half of the exterior diameter of the outer pipe 41.

The radially outwardly directed extensions 12 and 16 or 22 and 26 are formed on the free ends of the heating plates 11 and 21. Heating plates 11 and 12 comprise electrical heating elements supplied with current through connectors 34 and 35. The extensions 12 and 22 form seating lugs 18 and 28 for the pivot shaft 20, which pivotably connects both heating plates 11 and 21 to each other. In place of the pivotable seating, in another embodiment of the invention, a displacement mechanism is used which permits parallel displacement of the heating plates 11 and 21 for placing them in an opened position.

The heating plates 11 and 12 are connected to each other such that their interior receptacles 14 and 24 are directed towards each other, forming an annular disk in the closed position. The sides of the corresponding extensions 12, 22 and 16, 26 facing each other have first and second corresponding sets of recesses 13, 23 and 17, 27 which receive the guide arms 45 and 46. Accordingly, the distance between the first and second sets of recesses corresponds to the distance between the guide arms 45 and 46. The recesses 13 and 23 form a receptacle for the guide arm 45. They are of equal size, adapted in their width to the diameter of the guide arm 45 and in their depth to the radius of the guide arm 45. The distance between the center 30 or 32 of the recess 13 or 23 and of the center 31 or 33 of the recess 17 or 27 corresponds to the distance between the central longitudinal axes of the guide arms 45 and 46, while the distance from center 30 or 32 of recess 13 or 23 or from center 31 or 33 of recess 17 or 27 to the center 19 or 29 of the heating plate 11 or 21 is half the distance between the centers 30, 32 of recess 13, 23 and the centers 31, 33 of recess 17, 27 and corresponds to the distance between the central longitudinal axes of the guide arms 45 and 46 and the central longitudinal axis 42 of the welding jig. So that the heating device can be adjusted on the guide arms 45 and 46 during heating, the second set of corresponding recesses 17 and 27 of the corresponding extensions 16 and 26 are open facing away from central longitudinal axis 42 of the welding jig. It is also important that the pivot axis 20 or the displacement mechanism are positioned outside of the recesses 13 and 23 and also that, in the closed position of the heating device 10, the extensions 16 and 26 are connected to each other in a quickly releasable manner outside of the guide arm 46. Commercially available quick-release closures, such as toggle catches or the like, are suitable for this purpose. On the sides of the corresponding extensions 12, 16, 22 and 26 facing each other, the heating plates 11 and 21 may be provided with matched centering projections and receptacles. The disposition may be asymmetrical, so that identical heating plates 11 and 21 can be used.

The corresponding first set of recesses 13 and 23 may each have a semi-circular cross section corresponding to one-half of the cross section of the guide arm 45.

Because of the positioning of the guide arms 45 and 46 in the area of the plane of separation of the two heating plates 11 and 21, the guide arms 45 and 46 do not limit the opening angle of the heating plates as they do with the known heating devices which are slipped on the inner pipe 40 vertically to the plane of connection of the guide arms. The arrow 36 indicates how the heating device 10, which is in the opened position, is slipped on, namely between the two front faces of the outer pipes 41 fixed in the two clamping devices.

We claim:

1. In a heating device for a welding jig having two guide arms with clamping devices for securing in place one of plastic pipe sections and plastic moldings to be welded together, said clamping devices being displaceable in relation to each other, and having two semi-circular electrical heating plates with facing interior receptacles and free ends which are connectable to each other, the improvement comprising:
   a receptacle radius of the facing interior receptacles (14, 24) of the semi-circular electrical heating plates (11, 21) being one of equal to and greater than an inner pipe radius of an outer inner pipe circumference of an inner pipe (40) on which an outer pipe (41) to be welded is slipped,
   a plate radius of an outer plate circumference (15, 25) of the semi-circular electrical heating plates (11, 21) being greater than an outer pipe radius of an outer pipe circumference of the outer pipe (41),
   the semi-circular electrical heating plates (11, 21) having radially outwardly directed extensions (12, 16, 22, 26) on said free ends, said radially outwardly directed extensions having, on extension sides facing each other, recesses (13, 17, 23, 27) to receive the guide arms (45, 46) of the welding jig,
   the semi-circular electrical heating plates (11, 21) having connecting points disposed in the radially outwardly directed extensions (12, 16, 22, 26) outside of said recesses (13, 17, 23, 27) for the guide arms (45, 46),
   a recess distance between the centers of the recesses corresponding to a guide arm distance between the center longitudinal axes of the guide arms, and
   a plate distance between the receptacle center of the receptacle formed by the semi-circular electrical heating plates and the centers of the recesses corresponding to one half said recess distance.

2. A heating device in accordance with claim 1, wherein one half of each of the recesses (13, 17, 23, 27) is located on each of the two semi-circular electrical heating plates (11, 21).

3. A heating device in accordance with claim 2, wherein the semi-circular electrical heating plates (11, 21) are pivotally connected at a corresponding first set of said radially outwardly directed extensions (12, 22), a pivotal axis of pivot (20) being oriented parallel to heating surfaces of the semi-circular electrical heating plates (11, 21).

4. A heating device in accordance with claim 2, wherein the semi-circular electrical heating plates (11, 21) are adjustably connected to each other at a corresponding first set of said radially outwardly directed extensions (12, 22), a direction of adjustment being oriented perpendicular to a plane of separation of the semi-circular electrical heating plates (11, 21).

5. A heating device in accordance with claim 4, wherein a corresponding second set of said radially outwardly directed extensions (16, 26) of the semi-circular electrical heating plates (11, 21) are securable to each other by a quick-release closure.

6. A heating device in accordance with claim 5, wherein each of the recesses (13, 23) in said corresponding first set of said radially outwardly directed extensions (12, 22) are in a shape of one of semi-circular and rectangular grooves adapted to fit around one-half of each of the guide arms (45, 46).

7. A heating device in accordance with claim 6, wherein each of the recesses (17, 27) in said corresponding second set of said radially outwardly directed extensions (16, 26) are open towards an end of the radially outwardly directed extensions (16, 26) and have a depth of a radius of the guide arms (45, 46).

8. A heating device in accordance with claim 1,
wherein the semi-circular electrical heating plates (11, 21) are pivotally connected at a corresponding first set of said radially outwardly directed extensions (12, 22), a pivotal axis of pivot (20) being oriented parallel to heating surfaces of the semi-circular electrical heating plates (11, 21).

9. A heating device in accordance with claim 1,
wherein the semi-circular electrical heating plates (11, 21) are adjustably connected to each other at a corresponding first set of said radially outwardly directed extensions (12, 22), a direction of adjustment being oriented perpendicular to a plane of separation of the semi-circular electrical heating plates (11, 21).

10. A heating device in accordance with claim 3,
wherein a corresponding second set of said radially outwardly directed extensions (16, 26) of the semi-circular electrical heating plates (11, 21) are securable to each other by a quick-release closure.

11. A heating device in accordance with claim 8,
wherein a corresponding second set of said radially outwardly directed extensions (16, 26) of the semi-circular electrical heating plates (11, 21) are securable to each other by a quick-release closure.

12. A heating device in accordance with claim 3,
wherein each of the recesses (13, 23) in said corresponding first set of said radially outwardly directed extensions (12, 22) are in a shape of one of semi-circular and rectangular grooves adapted to fit around one-half of each of the guide arms (45, 46).

13. A heating device in accordance with claim 8,
wherein each of the recesses (13, 23) in said corresponding first set of said radially outwardly directed extensions (12, 22) are in a shape of one of semi-circular and rectangular grooves adapted to fit around one-half of each of the guide arms (45, 46).

14. A heating device in accordance with claim 3,
wherein each of the recesses (17, 27) in said corresponding second set of said radially outwardly directed extensions (16, 26) are open towards an end of the radially outwardly directed extensions and have a depth of a radius of the guide arms (45, 46).

15. A heating device in accordance with claim 8,
wherein each of the recesses (17, 27) in said corresponding second set of extensions (16, 26) are open towards an end of the radially outwardly directed extensions (16, 26) and have a depth of a radius of the guide arms (45, 46).

16. A heating device in accordance with claim 9,
wherein a corresponding second set of said radially outwardly directed extensions (16, 26) of the electrical heating plate (11, 21) are securable to each other by a quick-release closure.

17. A heating device in accordance with claim 9,
wherein each of the recesses (13, 23) in said corresponding first set of said radially outwardly directed extensions (12, 22) are in a shape of one of semi-circular and rectangular grooves adapted to fit around one-half of each of the guide arms (45, 46).

18. A heating device in accordance with claim 9,
wherein each of the recesses (17, 27) in a corresponding second set of said radially outwardly directed extensions (16, 26) are open towards an end of the radially outwardly directed extensions (16, 26) and have a depth of a radius of the guide arms (45, 46).

* * * * *